United States Patent
Cope et al.

(10) Patent No.: US 8,718,258 B2
(45) Date of Patent: May 6, 2014

(54) SYSTEM AND METHOD FOR JURISDICTIONAL ROUTING

(75) Inventors: Warren B. Cope, Olathe, KS (US); Von K. McConnell, Leawood, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 1799 days.

(21) Appl. No.: 11/041,344

(22) Filed: Jan. 24, 2005

(65) Prior Publication Data

US 2006/0177035 A1    Aug. 10, 2006

(51) Int. Cl.
    *H04M 15/12*      (2006.01)

(52) U.S. Cl.
    USPC ............ 379/211.02; 379/221.01; 379/266.02; 379/273

(58) Field of Classification Search
    USPC .......... 379/211.02, 221.01, 266.02, 273, 272, 379/221.02
    See application file for complete search history.

(56) References Cited

U.S. PATENT DOCUMENTS

| | | | |
|---|---|---|---|
| 5,903,639 A * | 5/1999 | Lipchock et al. | ........ 379/221.08 |
| 6,064,653 A * | 5/2000 | Farris | .............. 370/237 |
| 6,442,169 B1 * | 8/2002 | Lewis | ............. 370/401 |
| 6,614,781 B1 * | 9/2003 | Elliott et al. | .................. 370/352 |
| 2002/0169887 A1 | 11/2002 | MeLampy et al. | |
| 2003/0152210 A1 * | 8/2003 | Delaney et al. | ........... 379/220.01 |
| 2003/0198216 A1 * | 10/2003 | Lewis | ............. 370/352 |
| 2004/0022237 A1 | 2/2004 | Elliott et al. | |
| 2004/0218748 A1 | 11/2004 | Fisher | |
| 2005/0094623 A1 * | 5/2005 | D'Eletto | ............ 370/352 |
| 2005/0190721 A1 * | 9/2005 | Pershan | .......... 370/328 |
| 2005/0226400 A1 * | 10/2005 | Farber et al. | .............. 379/114.01 |

FOREIGN PATENT DOCUMENTS

GB       1 384 748      2/1975
WO    WO 2005/004390      1/2005

* cited by examiner

*Primary Examiner* — Duc Nguyen
*Assistant Examiner* — Yosef K Laekemariam

(57) ABSTRACT

A system and method for routing calls based on the different fee structure between voice and data is disclosed. The origination type for an incoming call is determined. When the incoming call is a VoIP call then the call is routed based, in part, on selecting the minimum fee required to terminate the call.

14 Claims, 4 Drawing Sheets

SYSTEM AND METHOD FOR JURISDICTIONAL ROUTING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

Communication networks can have different types of incoming calls. For example, calls may originate as time division multiple (TDM) calls or as Voice over Internet Protocol (VoIP) calls. The TDM calls are analog calls that may be converted into packets by the communication network and then routed, or may be routed as an analog signals. The VoIP calls have already been converted into a stream of packets before entering the communications network. Currently, VoIP calls are typically routed in the same way that TDM calls are routed. Many government bodies have established different fee structures for voice communications than for data communications. The fee structures may also be based on if the call originates and terminates within the same government jurisdiction. Because the VoIP calls have already been converted into a stream of data packets before entering the communications network, the communications network may be able to route the VoIP calls differently than the TDM calls to take advantage of the different fee structure between voice and data communications.

Therefore there is a need for a system and method for routing calls based on the different fee structure between voice and data.

SUMMARY OF THE INVENTION

A system and method for routing calls based on the different fee structure between voice and data is disclosed. The origination type for an incoming call is determined. When the incoming call is a VoIP call then the call is routed based, in part, on selecting the minimum fee required to terminate the call.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
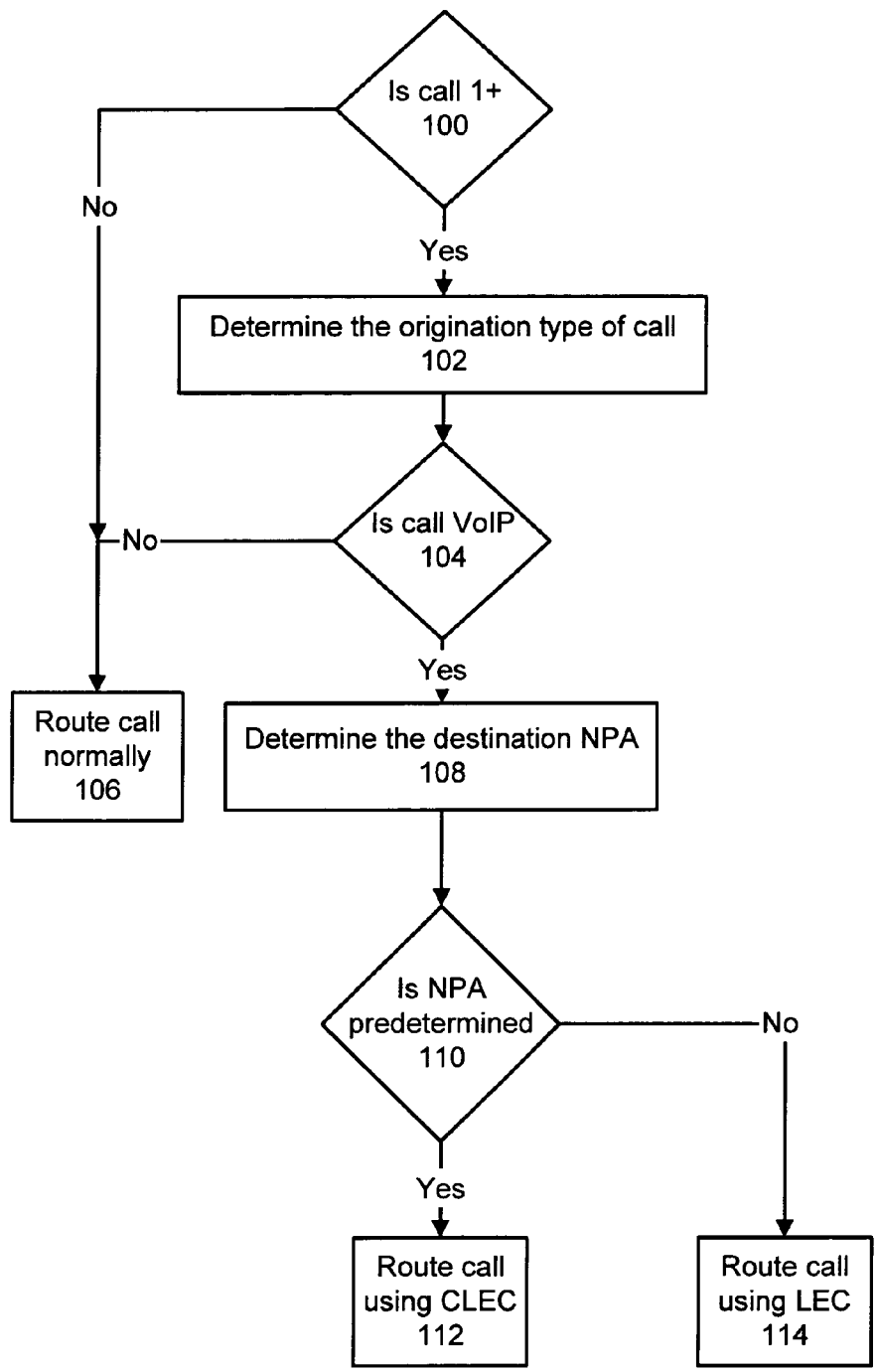
FIG. 1 is a flow chart for a method of routing a 1+ call based on the call origination type in one example embodiment of the current invention.

FIG. 1 is a flow chart for a method of routing a 1+ call based on the call origination type in one example embodiment of the current invention. At step 100 a check is made to determine if an incoming call is a 1+ call. 1+ calls are also known as long distance calls. When the incoming call is not a 1+ call then the call is routed normally at step 106. When the incoming call is a 1+ call then the origination type of the call is determined at step 102. At step 104 a check is made to determine if the origination type of the call is VoIP. When the origination type of the call is not VoIP then the call is routed normally at step 106. When the call origination type is VoIP then the destination numbering plan area (NPA) is determined at step 110. NPA is also known as the area code. At step 110 the NPA is checked to determine if the NPA is a predetermined NPA. When the NPA is a predetermined NPA then the call is routed using a Competitive Local Exchange Carrier (CLEC) at step 112. When the NPA is not a predetermined NPA then the call is routed using a Local Exchange Carrier (LEC) at step 114. There may be any number of predetermined NPAs ranging from zero up to the total number of NPAs in the US.

The predetermined NPAs correspond to NPAs that reduce the access cost for termination. There are at least two components to the access cost for termination. The first component is the technical or equipment cost for termination. The second component is the legal cost or regulatory fee structure for terminating a call. The legal cost or regulatory fee structure may be different depending on if the call is a TDM call or if the call is VoIP and can be treated as a data transfer. One example of a data transfer is information accessed through the Internet. In one example embodiment of the current invention the equipment cost for termination is neglected and the VoIP calls are routed based on the legal costs for termination. In another example embodiment the legal costs and the equipment costs are both used to select the total minimum termination cost. The predetermined NPAs may correspond to NPAs that result in an intra-state call.

Figure 2:
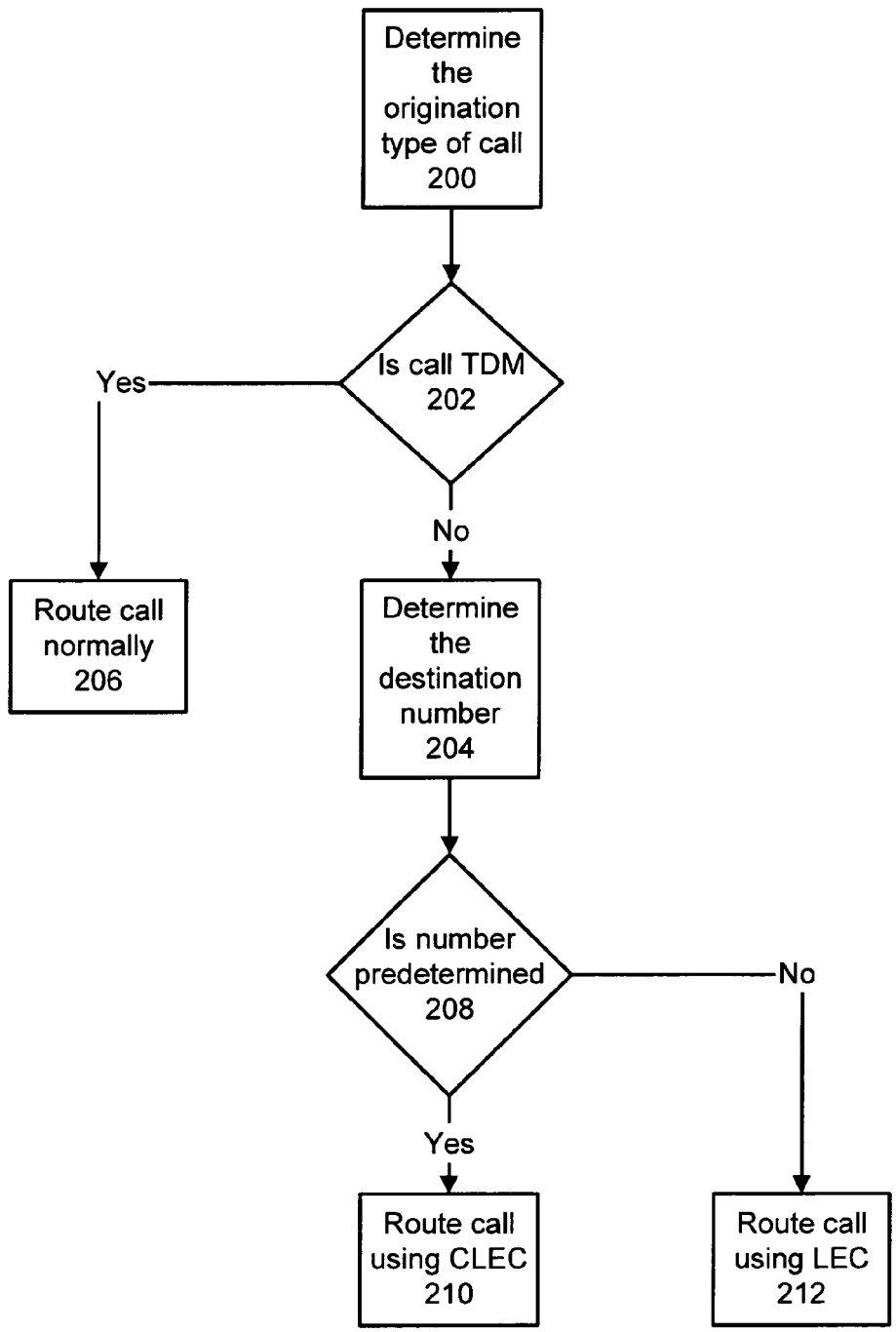
FIG. 2 is a flow chart for a method of routing a call based on the call origination type in one example embodiment of the current invention.

Some jurisdictional areas may only have one NPA for the entire region, for example a state with low population may only have one area code for the entire state. Even with only one area code there may be differences in the regulatory fee structure for terminating a data call vs. terminating a TDM call within the jurisdictional area. FIG. 2 is a flow chart for a method of routing a call based on the call origination type in one example embodiment of the current invention. When an incoming call is detected then the origination type of the call is determined at step 200. At step 202 a check is made to determine if the origination type of the call is TDM. When the origination type of the call is TDM then the call is routed normally at step 206. When the call origination type is not TDM then the destination number is determined at step 204. At step 208 the destination number is checked to determine if the destination number is a predetermined destination number. When the destination number is a predetermined destination number then the call is routed using a Competitive Local Exchange Carrier (CLEC) at step 210. When the destination number is not a predetermined destination number then the call is routed using a Local Exchange Carrier (LEC) at step 212. In one example embodiment of the current invention, at step 208 the prefix of the destination number may be used to determine if the destination number is a predetermined destination number. In another example embodiment of the current invention, at step 208 the full destination number may be used to determine if the destination number is a predetermined destination number. The method shown in FIG. 2 may also be used when the incoming call is a 1+ number. When using the method shown in FIG. 2 with an incoming 1+ number, part or all of the ten digit destination number may be used to determine when the destination number is a predetermined destination number.

Figure 3:
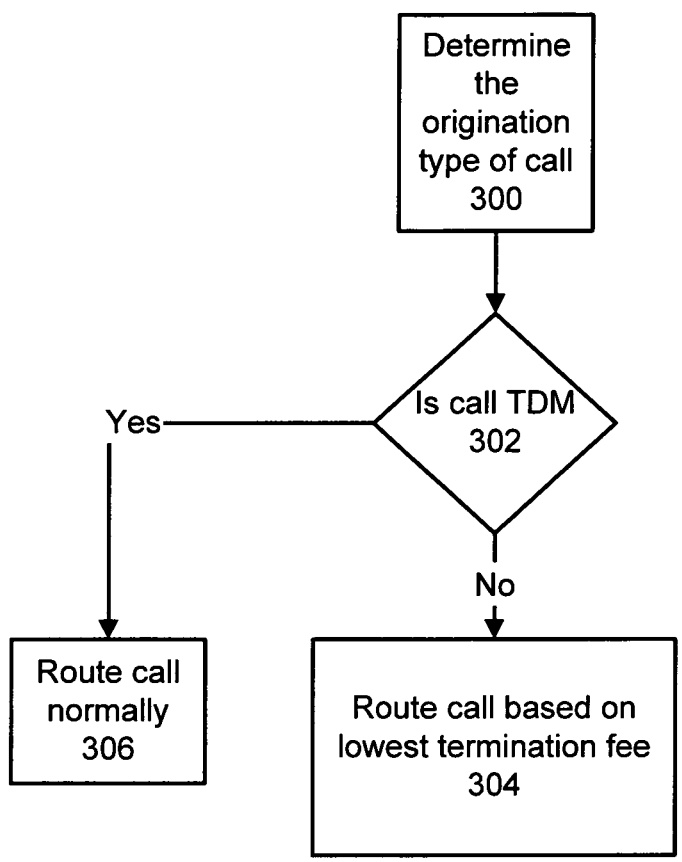
FIG. 3 is a flow chart for a method of routing a call based on the lowest termination fee in one example embodiment of the current invention.

FIG. 3 is a flow chart for a method of routing a call based on the lowest termination fee in one example embodiment of the current invention. At step 300 the origination type for an incoming call is determined. At step 302 a check is made to determine if the origination type is TDM. When the incoming call is TDM then the call is routed normally at step 306. When the call origination type is not TDM then the call is routed based on the lowest termination fee in step 304. In one example embodiment of the current invention the equipment cost for termination is neglected and the non-TDM calls are routed based on the lowest legal costs for termination. In another example embodiment the legal costs and the equipment costs are both used to select the total minimum termination cost.

Figure 4:
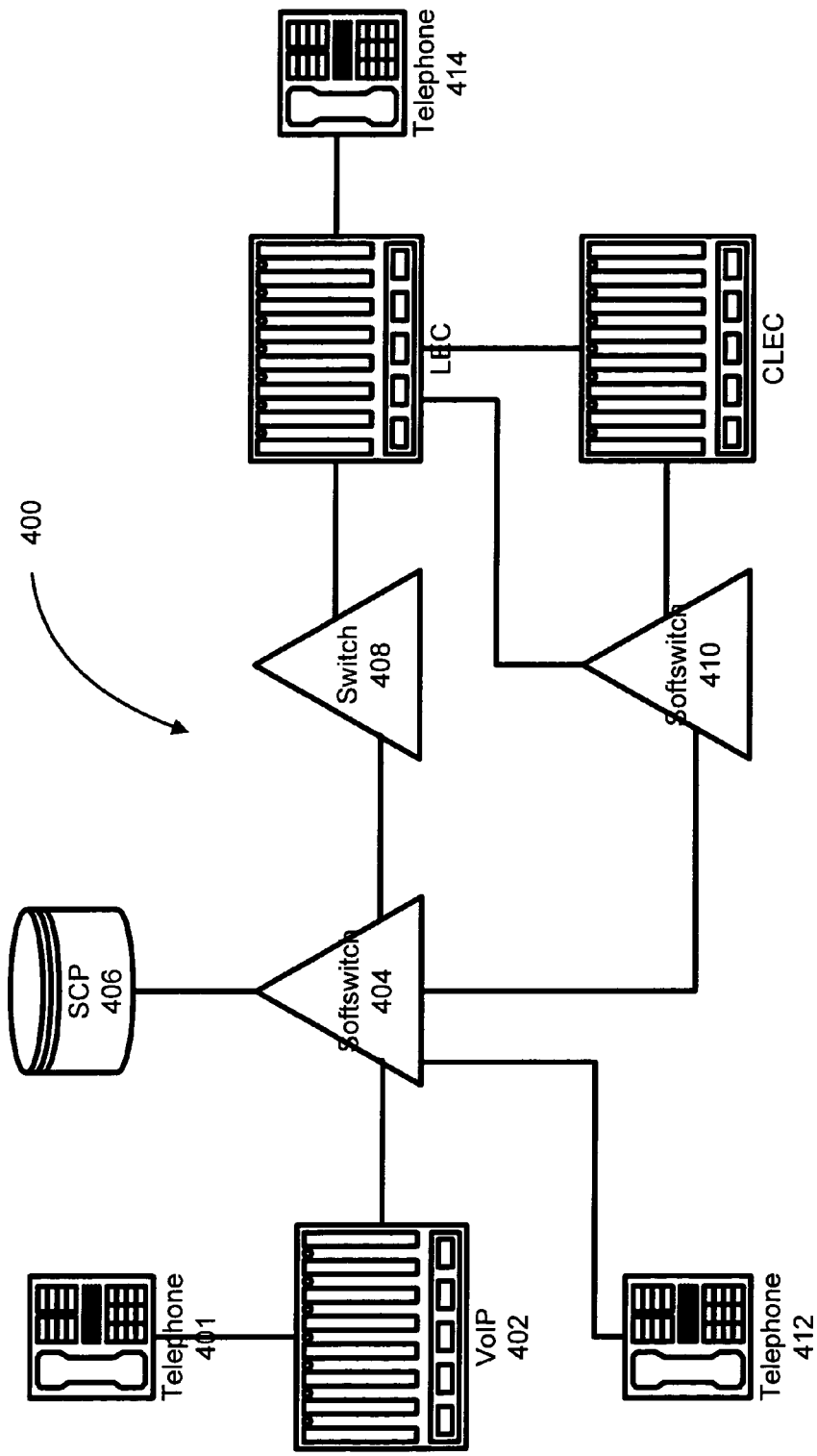
FIG. 4 is a block diagram of an apparatus for routing calls based on the call origination type in one example embodiment of the current invention.

FIG. 4 is a block diagram of an apparatus for routing calls based on the call origination type in one example embodiment of the current invention. System 400 comprises switches 404, 408, and 410 and service control point (SCP) 406. Switch 404 is connected to SCP 406 and to switches 410 and 408. Switches 404 and 410 may be soft switches. Connected to system 400 through switch 404 is VoIP system 402 and telephone 412. Local exchange carrier (LEC) is connected to system 400 through switch 408 and switch 410. Competitive local exchange carrier (CLEC) is connected to system 400 through switch 410. CLEC is connected to LEC. Phone 414 is connected to LEC and phone 401 is connected to VoIP 402.

In one example embodiment of the current invention, switch 404 detects incoming calls. The incoming calls may be from VoIP 402 or phone 412. When the incoming call is a 1+ call, switch 404 queries SCP 406 for the routing for the call. When the incoming call is from VoIP 402, SCP compares the destination numbering plan area (NPA) to determine if the destination NPA is a predetermined NPA. When the destination NPA is a predetermined NPA then SCP routes the call through switch 410 to CLEC. CLEC will route the call through LEC and the LEC will terminate the call. When the destination NPA is not a predetermined NPA then SCP routes the call through switch 410 to LEC and the LEC will terminate the call.

In another example embodiment of the current invention, switch 404 detects incoming calls. The incoming calls may be from VoIP 402 or phone 412. When the incoming call is from VoIP then the destination number is checked to determine when the destination number is a predetermined destination number. The check on the destination number typically occurs in SCP 406. When switch 404 is a soft switch the check on the destination number may occur at switch 404. When the destination number is a predetermined destination number then the call is routed through switch 410 to CLEC. CLEC will route the call through LEC and the LEC will terminate the call. When the destination number is not a predetermined destination number then the call is routed through switch 410 to LEC and the LEC will terminate the call. In one example embodiment of the current invention, the prefix of the destination number may be used to determine if the destination number is a predetermined destination number. In another example embodiment of the current invention, the full destination number may be used to determine if the destination number is a predetermined destination number. When the incoming call is a 1+ call, part or all of the ten digit destination number may be used to determine when the destination number is a predetermined destination number.

We claim:

1. A method of call routing, the method comprising:
   receiving an incoming call in a switch;
   determining whether or not an origination type for the call is voice over internet protocol (VoIP);
   when the origination type is VoIP then:
      determining a numbering plan area (NPA) for a destination number;
         when the destination number NPA comprises a predetermined NPA then routing the call to a local exchange carrier (LEC) through a competitive local exchange carrier (CLEC);
         when the destination number NPA does not comprise a predetermined NPA then routing the call to the LEC without routing through the CLEC; and
   when the origination type is not VoIP then terminating the call to the LEC without routing through the CLEC.

2. The method of claim 1 further comprising:
   when the call is a local call then routing the call directly through the LEC without routing through the CLEC.

3. The method of claim 1 where there are a plurality of predetermined NPA's.

4. The method of claim 1 where the predetermined NPA indicates an intra-state call.

5. The method of claim 1 further comprising:
   first determining if the incoming call is a 1+ call;
   when the incoming call is not a 1+ call then routing the call using the LEC.

6. An apparatus, comprising:
   a switch;
   a service control point (SCP);
   the switch is configured to detect an incoming call, determine whether or not an origination type for the call is voice over internet protocol (VoIP), and when the origination type for the call is not VoIP, terminate the call to a local exchange carrier (LEC) without routing through a competitive local exchange carrier (CLEC);
   the switch is configured to, when the origination type for the call is VoIP, transfer a query for delivery to the SCP for routing instructions for the call;
   the SCP is configured to, in response to the query, determine whether a destination number of the call comprises a predetermined destination number;
   the SCP is configured to, when the destination number comprises the predetermined destination number, determine the routing instructions to route the call to the LEC through the CLEC;
   the SCP is configured to, when the destination number does not comprise the predetermined destination number, determine the routing instructions to route the call to the LEC without routing through the CLEC; and the switch is configured to receive the routing instructions in response to the query and route the call based on the routing instructions.

7. The apparatus of claim 6 where the predetermined destination number indicates an intra-state call.

8. The apparatus of claim 6 where the switch is a soft switch.

9. The apparatus of claim 6 where the SCP uses only part of the destination number when determining whether the destination number comprises the predetermined destination number.

10. The apparatus of claim 9 where only a prefix of the destination number is used when determining whether the destination number comprises the predetermined destination number.

11. The apparatus of claim 9 where only an area code of the destination number is used when determining whether the destination number comprises the predetermined destination number.

12. An apparatus, comprising:
a switch;
a service control point (SCP);
the switch configured to detect an incoming call, determine whether or nor if the incoming call comprises a 1+ call, and when the call does not comprise the 1+ call, terminate the call to a local exchange carrier (LEC) without routing through a competitive local exchange carrier (CLEC);
the switch configured to, when the call comprises the 1+ call, determine whether or not an origination type for the call is voice internet protocol (VoIP), and when the origination type for the call is not VoIP terminate the call to the LEC without routing through the CLEC;
the switch configured to, when the origination type for the call is VoIP, transfer a query for delivery to the SCP for routing instructions for the call;
the SCP configured to, in response to the query, determine whether a numbering plan area (NPA) for a destination number of the call comprises a predetermined NPA;
the SCP configured to, when the destination number NPA comprises the predetermined NPA, determine the routing instructions to route the call to the LEC through the CLEC;
the SCP configured to, when the destination number NPA does not comprise the predetermined NPA, determine the routing instructions to route the call to the LEC without routing through the CLEC; and
the switch configured to receive the routing instructions in response to the query and route the call based on the routing instructions.

13. The apparatus of claim 12 where the predetermined NPA indicates a reduced cost for terminating the call based on both an equipment cost for routing the call and a lowest available legal regulatory termination fee.

14. The method of claim 12 where the predetermined NPA indicates an intra-state call.

\* \* \* \* \*